United States Patent

Plakas et al.

[15] 3,646,345
[45] Feb. 29, 1972

[54] DIRECT INTERACTION DETERMINATION OF PRIMARY PRODUCTIVITY

[72] Inventors: Chris J. Plakas, 3645 Bangor St, S.E. Washington, D.C. 20020; Rosemary Fry, 3223 Cleveland Ave, Kansas City, Kans. 66104

[22] Filed: June 22, 1970

[21] Appl. No.: 48,181

[52] U.S. Cl. ............... 250/71.5 R, 250/43.5 MR, 250/83 SA, 250/106 SC, 250/106 T
[51] Int. Cl. .......................................................... G01t 1/20
[58] Field of Search ............. 250/71.5 R, 71 T, 71 R, 106 SC, 250/106 T, 83 SA, 43.5 MR

[56] References Cited

UNITED STATES PATENTS 3,017,510   1/1962   Roucayrol et al. ................ 250/71.5 R

*Primary Examiner*—Walter Stolwein
*Assistant Examiner*—Morton J. Frome

[57] ABSTRACT

Apparatus for measuring the primary productivity in situ of an aquatic sample by detecting scintillation fluorescence through surface contact of a scintillator and metabolized organisms carrying labeled carbon fixed photosynthetically therein, comprising a photosynthesis chamber where sample and labeled carbon are introduced for photosynthetic fixation, a filter tape for filtering the metabolized organisms, a scintillator tape and photomultiplier detector means for converting energy of beta particles to fluorescence and then to electrical pulses that are directly proportional to the amount of labeled carbon fixed by the organisms, a recorder for recording the output data and logic circuitry for programming the sequence of operation, thus accurately determining the primary productivity per unit of biomass.

2 Claims, 4 Drawing Figures

PATENTED FEB 29 1972　　3,646,345

INVENTORS
Chris J Plakas
Rosemary Fry

DIRECT INTERACTION DETERMINATION OF PRIMARY PRODUCTIVITY

FIELD OF THE INVENTION

The present invention relates to an apparatus for detecting the primary productivity of aquatic environments in rivers, lakes and seas and, more specifically, to an apparatus for measuring the radioactive level of labeled carbon fixed photosynthetically by organisms in aquatic samples.

DESCRIPTION OF THE PRIOR ART

The rate at which carbon is fixed photosynthetically in aquatic environments reveals the conditions of the physical balance of the water and the life it supports. In rivers and lakes monitoring of algal productivity can indicate the degree of pollution caused by waste influents. Since marine phytoplankton is the initial link in the complex food chain of the sea, accurate records of variation in primary productivity in different geographical locations and during different seasons may be used to predict the quantities and qualities of fish harvests at specific places and times. Detailed descriptions and evaluations of current primary productivity measurement techniques may be found in the following selected literature: Anderson, Geo. and Karl Banse, Hydrography and phytoplankton production, in M. S. Doty (ed.) *Proceedings*, Conf. Primary Productivity Measurements, Marine and Freshwater, TID-7633, pp. 61–90, 1963; Cassie, R. M., Microdistribution and other error components of $C^{14}$ primary production estimates, *Limnol. Oceanog*. 7(2), pp. 121–130, 1962; Davis, Charles C., On questions of production and productivity in ecology, *Arch. Hydrobiol*. 59(2), pp. 145–161, 1963; Dyson, H., H. R. Jitts, and B. D. Scott, Techniques for measuring oceanic primary production using radioactive carbon, Division of Fisheries and Oceanography Technical Paper No. 18, Commonwealth Scientific and Industrial Research Organization, Australia, 1965; Jitts, H. R., The standardization and comparison of measurements of primary production by the $C^{14}$ technique, C.S.I.R.O. Div. of Fish and Oceano. Conf. Pri. Prod. Measurements, TID-7633, pp. 114–120, 1963; Levin, G. V., C. J. Plakas, and D. J. Simons, The Sea Gulliver System, Automated Determination of Primary Productivity of the Sea, TID-4500 ED, 1969; and Saunders, Geo. W., F. B. Trama, and R. W. Bachmann, *Evaluation of a Modifided $C^{14}$ Technique for Shipboard Estimation of Photosynthesis in Large Lakes*, Michigan Univ. Institute of Science and Technology, Ann Arbor, 1962.

The major disadvantages of current instrumentation for measuring in situ primary productivity by the $^{14}C$ technique include the cumbersomeness and complexity of instrumentation, expensive maintenance, environmental fouling, and limited accuracy of measurement. The object of the present invention is to apply the concept of surface contact to the $^{14}C$ method, whereby scintillator and sample interact directly, thus allowing for greater sensitivity of detection of low levels of metabolic activity while providing a simple, yet versatile and economical detection instrument. The outstanding features of the present instrument are that it is light weight and therefore operable by one person; surface contact of scintillator and sample increases sensitivity of detection; operation may be manual or programmed for automatic monitoring; and experiments may be conducted in shallow water or in small water bodies as well as in large areas or deep waters.

SUMMARY OF THE INVENTION

It is therefore an object of the present invention to provide an apparatus for detecting and measuring in situ the level of labeled carbon fixed by aquatic organisms.

Another object of the invention is to provide means for direct interaction of scintillator and sample in order to increase the efficiency and capability of detecting low levels of radiotracers.

Another object of the invention is to provide accurate detector means that will produce an output signal proportional to the amount of carbon fixed by the organisms.

Another object of the invention is to provide a portable apparatus easily manageable by one person and operated either manually or automatically for a sequence of experiments.

An additional object of the invention is to provide means for automated operation and recording of data under moored conditions.

An additional object of the invention is to provide an apparatus with a dark control for detection of heterotrophic $CO_2$ fixation.

BRIEF DESCRIPTION OF THE DRAWING

These and other objects and aspects of the invention will be further clarified by the following detailed description and accompanying drawings, wherein.

DESCRIPTION OF THE PREFERRED EMBODIMENTS

Figure 1:
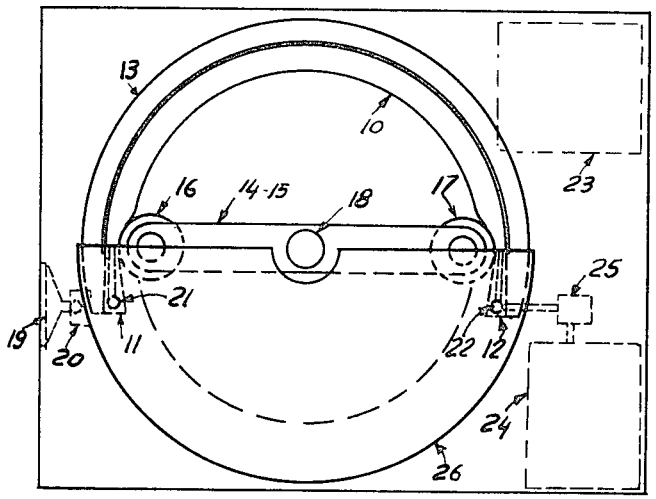
FIG. 1 is a top view of the apparatus showing the photosynthesis chamber with pump and the cover of the chamber for dark control.
Figure 2:
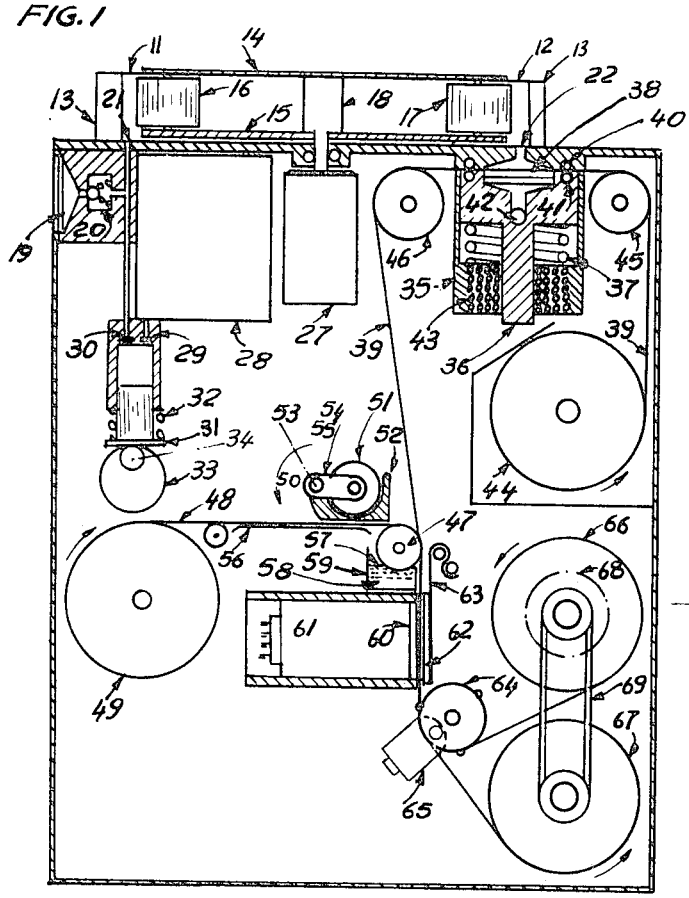
FIG. 2 is a sectional side view of the system showing the principles of operation according to the present invention.

Referring now to FIG. 1 of the drawings, the photosynthesis chamber, which operates under the same principles as a Randolph pump, is comprised of a light transparent flexible plastic tube 10, two stainless steel fitting blocks 11 and 12 to guide the flow to and from the tube, a tube support 13 made of hard transparent plastic, and a 24 v. DC motor 27 of 60 IN. OZ. and 2 minutes per revolution and shaft 18 that revolve two support arms 14 and 15 with soft plastic rollers 16 and 17 attached at the ends. Rollers 16 and 17 rotate in a clockwise direction around the shaft 18 and around their own axes compressing progressively tube 10 to create pressure in the fore part and suction in the rear, thus forcing sample to enter and fill tube 10. Aquatic sample of approximately 20 ml. enters through the coarse filter 19 which blocks the entrance of large suspended particles and one way valve 20 prevents labeled carbon from flowing outward. As shown in FIG. 2, labeled carbon is stored in tank 28. The pump assembly, comprised of one way inlet and outlet valves 29 and 30, piston 31, reset spring 32, cam 33, and 24-v. DC motor 34 of 10 IN. OZ. and 2 r.p.m.'s, forces 0.2 ml. of $^{14}C$ medium ($Na_2{}^{14}CO_3$) into tube 10 through port 21 simultaneously with the sample entry. Labeled carbon and sample remain in the photosynthesis chamber for 2 hours of incubation. As shown in FIG. 1, dark cover 26 made of soft black plastic and attached to support arm 14 may be positioned over the tube 10 by rotating the arms 14 and 15 half a revolution and thus facilitating a dark control test.

Following incubation the sample solution is forced out of tube 10 through the port 22 into the filter assembly 35 as shown in FIG. 2. Sliding block 36 is normally pushed upward by compression spring 37, pressing the filter 38 of tape 39 between two O-rings 40 and 41 of diameter slightly larger than the filter and thus sealing the flow of the sample from port 22 through filter 38 and into the port 42. Organisms with fixed carbon are collected on the filter 38 while filtrated waste liquid is transferred to a storage tank 23 as shown in FIG. 1. When the sequence of operation requires motion of tape 39, the solenoid coil 43 of FIG. 2 activates and the sliding block 36 releases the filter-tape 38/39. Distilled water from tank 24 of FIG. 1 is injected through port 22 by adjustable pressure valve 25 to rinse the collected organisms and remove any liquid containing radiotracer.

Referring now to FIG. 2 of the drawings, plastic tape 39, with filters 38 mounted over openings in its surface at equally spaced intervals, is carried by reel 44 and guided by free roller 45 through the filtration assembly 35. After the filtering process is completed the filter-tape 38/39 is guided by free roller 46 to a point at free roller 47 where its inner surface makes contact with the inner surface of plastic tape 48. Tape 48 is carried by reel 49 and passes under the scintillator feeder 50 comprised of roller 51 made of spongy rubber and turning free on its axis, holder 52 containing liquid scintillator, and minimotor 53 that operates two arms 54 and 55 which rotate roller 51 from the holder 52 to the tape surface 48. Tape 48 rests on support plate 56 as the roller 51 deposits scintillation oil on its inner surface due to roller rotation caused by tape motion and friction between roller and tape. The level of scintillation oil in holder 52 is kept low to avoid overflow. Tape 48 then moves over rubber roller 47 which turns free on its shaft due to the friction of the moving tape. The sponge roller transfers coupling oil 58 from the container 59 to roller 47, that in turn deposits a film of coupling oil on the outer surface of tape 48 for efficient light coupling on the photocathode 60. A mirror 62 supported on a spring 63 exercises pressure on tapes 39 and 48 for positive contact with each other and with the photocathode 60. When the scintillation liquid and the carbon fixed organisms make direct contact interaction occurs resulting in light emission which is measured by the detector 61 while the tapes 39 and 48 are stationary on the photocathode 60. The movement of both tapes is controlled by the programming geared pulley 64, encoder 65, and the logic circuitry of the instrument. The filter tape 39 is collected on the takeup reel 66 and the scintillation tape 48 is collected on reel 67. Both reels 66 and 67 are rotated by the 24-v. DC motor 68 of 40 IN. OZ. and approximately 5 r.p.m.'s and the positive drive belt 69. The motor 68 operates under logic circuitry using programming geared pulley 64 as tape locator and timer.

The logic circuitry of the instrument (not shown) is programmed to operate the motor 27 of the Randolph pump, to locate the dark control cover for photosynthesis or dark control, to operate the motor 34 of the $^{14}C$ medium pump, to operate the solenoid of the filter assembly, to operate the rinsing valve, to operate the minimotor 53 of the liquid scintillator feeder, to move at sequential steps the filter tape and the scintillation tape, to switch the optoelectronic circuitry on and off, and to monitor the data recording equipment.

Figure 3:
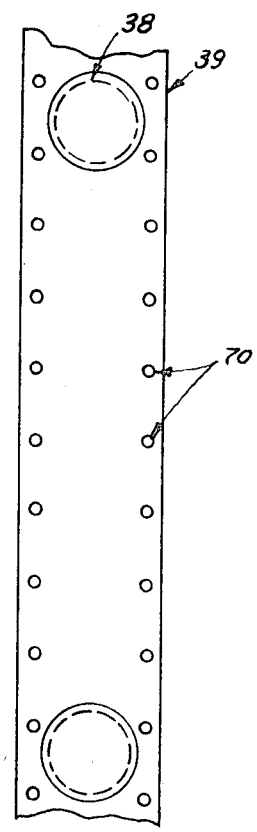
FIG. 3 is a view of the filter tape showing the plastic tape and the filter mounted at equal intervals.

Referring now to FIG. 3 of the drawings, the tape 39, made of plastic polyethylene approximately 0.01 inch thick, has teflon filters 38 of 20 mm. diameter mounted over 17 mm. diameter openings in its surface. The guide holes 70 help to secure positive positioning of the filter during sequential steps. The distance between the filters is spaced so that the detection sequence for one filter will have been completed before the filtering sequence begins on the next filter.

The labeled carbon fixed in the organisms collected by the filter emits beta particles which produce a flash of light when absorbed by the liquid scintillator. Because of the coupling means, light is transmitted to the photocathode 60 of a S-11 photomultiplier tube 61. The output signal of the photomultiplier is fed into an amplifier, discriminator, pulse shaper, and scaler that records accumulated data (electronics not shown).

Figure 4:
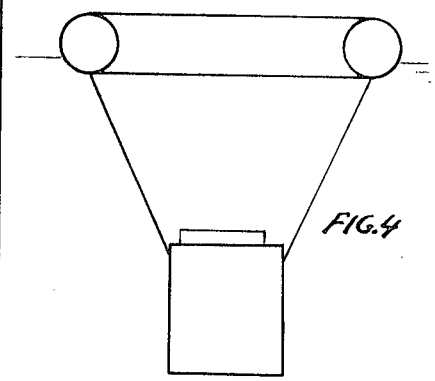
FIG. 4 shows the apparatus as it would look suspended from a moored flotation ring.

All systems except the photosynthesis chamber are housed in a waterproof, lighttight enclosure with service doors hermetically closed. The apparatus is suspended on a flotation ring as shown in FIG. 4. The connecting cables may be adjusted to achieve the desired depth of the experiment. The 24 volts of power required for the operation of the instrument may normally be supplied by batteries. When the instrument is used near the shore, i.e., in small lakes or narrow rivers, the power supply and recording equipment may be ashore and connected with the main instrument through cables.

Thus there has been provided an efficient, lightweight, portable apparatus that permits accurate testing of aquatic sample either manually or automatically for determination of primary productivity under a variety of environmental conditions. Due to the direct contact of sample and scintillator high sensitivity is attained in counting the $^{14}C$ level fixed photosynthetically by the organisms. However, the scope of the invention is not limited to the specific embodiments described herein but includes the various alternatives and modifications that fall within the true spirit and scope of the invention as defined by the following claims.

What is claimed is:

1. An apparatus for determining primary productivity in situ in aquatic environments by detecting scintillation fluorescence through direct contact of a scintillator and labeled carbon which has been fixed photosynthetically in sample organisms by using the carbon-14 technique comprising:

means to take an aquatic sample, means to simultaneously place a carbon-14 medium and said aquatic sample in a photosynthesis chamber to form an incubated sample solution, means to pass a filter tape through a filtering and rinsing chamber, means to pass said incubated sample solution into said filtering and rinsing chamber and through said filter tape to collect labeled organisms on said filter tape, rinsing means to flush the excess labeled liquid from said filter tape, storage means to store said excess labeled liquid and excess filtered sample solution, scintillator feeder means for depositing a uniform layer of scintillation oil on the inner surface of a transparent tape to form a scintillation tape, means for applying coupling oil to the outer surface of the scintillation tape by a roller mechanism to facilitate good optical contact between said scintillation tape and the photocathode of a photomultiplier with no air interface, means for bringing the labeled organisms on said filter tape and said scintillator tape into direct contact to produce scintillations proportional to the number of beta particle disintegrations, roller means for guiding the filter tape and scintillation tape through the narrow space between said photomultiplier and a mirror-spring mechanism to produce a positive contact with each other and with the photomultiplier, means for controlling the motion of said tapes as they pass the photomultiplier, means for counting the number of disintegrated beta particle scintillations which is proportional to the amount of carbon fixed by the organisms, and means for positioning the apparatus at the desired experimental locations.

2. The apparatus of claim 1 wherein said means for positioning the apparatus includes application of a flotation ring for suspending the apparatus, adjustable cables for achieving the desired depth of the experiment, and lighttight, waterproof housing means for sealing and filtering and detecting systems from the local environment.

* * * * *